US010634356B2

(12) United States Patent
Horikawa et al.

(10) Patent No.: US 10,634,356 B2
(45) Date of Patent: Apr. 28, 2020

(54) FUEL INJECTION NOZZLE, FUEL INJECTION MODULE AND GAS TURBINE

(71) Applicant: KAWASAKI JUKOGYO KABUSHIKI KAISHA, Hyogo (JP)

(72) Inventors: Atsushi Horikawa, Akashi (JP); Kunio Okada, Kakogawa (JP); Seiji Yamashita, Kobe (JP); Masahide Kazari, Akashi (JP); Takeo Oda, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 417 days.

(21) Appl. No.: 15/508,736

(22) PCT Filed: Sep. 28, 2015

(86) PCT No.: PCT/JP2015/004908
§ 371 (c)(1),
(2) Date: Mar. 3, 2017

(87) PCT Pub. No.: WO2016/051757
PCT Pub. Date: Apr. 7, 2016

(65) Prior Publication Data
US 2017/0284677 A1     Oct. 5, 2017

(30) Foreign Application Priority Data

Sep. 29, 2014  (JP) ................................ 2014-198177

(51) Int. Cl.
*F23R 3/28* (2006.01)
*F02C 7/232* (2006.01)
(Continued)

(52) U.S. Cl.
CPC .............. *F23R 3/286* (2013.01); *F02C 7/232* (2013.01); *F23D 14/08* (2013.01); *F23R 3/10* (2013.01); *F23R 3/28* (2013.01); *F23R 3/32* (2013.01)

(58) Field of Classification Search
CPC ........ F23R 33/28; F23R 33/286; F23R 33/10; F23R 33/32; F23R 3/286; F02C 7/232; F23D 14/08
See application file for complete search history.

(56) References Cited

U.S. PATENT DOCUMENTS 3,714,778 A * 2/1973 Howald ................... F23R 3/12
                                                           60/746
3,720,058 A * 3/1973 Tatem, Jr. et al. ........ F23R 3/28
                                                          261/79.1
(Continued)

FOREIGN PATENT DOCUMENTS

CN       102549341 A      7/2012
JP       S58-219329 A     12/1983
(Continued)

OTHER PUBLICATIONS

Lefebvre, A.H., Gas Turbine, Second Edition, Taylor & Francis, New York, 1998, pp. 34-35 (Year: 1998).*
(Continued)

*Primary Examiner* — Gerald L Sung
*Assistant Examiner* — Rene D Ford
(74) *Attorney, Agent, or Firm* — Studebaker & Brackett PC

(57) ABSTRACT

A fuel injection nozzle (31) of the present invention comprises a pre-mixing passage (34) which mixes fuel (103) and air (102) to generate an air-fuel mixture; and an injection port (33) which is located downstream of the pre-mixing passage (34) and injects the air-fuel mixture into a combustion chamber (26). The fuel injection port (33) has a slit
(Continued)

shape and a width that is less than a dimension that is twice as large as a quenching distance.

5 Claims, 8 Drawing Sheets

(51) Int. Cl.
    *F23D 14/08*     (2006.01)
    *F23R 3/32*     (2006.01)
    *F23R 3/10*     (2006.01)

(56) References Cited

U.S. PATENT DOCUMENTS

| | | | | |
|---|---|---|---|---|
| 3,999,378 | A * | 12/1976 | Tatem, Jr. | F02K 3/11 60/737 |
| 4,470,262 | A * | 9/1984 | Shekleton | F02C 7/2365 60/737 |
| 4,827,724 | A * | 5/1989 | Maghon | F01D 25/24 60/731 |
| 4,903,478 | A * | 2/1990 | Seto | F02C 7/222 60/39.281 |
| 4,967,561 | A * | 11/1990 | Bruhwiler | F23D 23/00 60/39.463 |
| 5,165,241 | A * | 11/1992 | Joshi | F23R 3/14 60/737 |
| 5,235,814 | A * | 8/1993 | Leonard | F23R 3/283 60/738 |
| 5,289,685 | A * | 3/1994 | Hoffa | F02C 7/222 60/739 |
| 5,361,586 | A * | 11/1994 | McWhirter | F23D 14/02 60/737 |
| 5,402,634 | A * | 4/1995 | Marshall | F02C 7/232 60/734 |
| 5,511,375 | A * | 4/1996 | Joshi | F01D 9/065 239/403 |
| 5,636,511 | A * | 6/1997 | Pfefferle | F01N 3/18 431/268 |
| 5,653,109 | A * | 8/1997 | Overton | F02C 7/222 60/739 |
| 5,822,992 | A * | 10/1998 | Dean | F23D 11/104 60/737 |
| 6,038,861 | A | 3/2000 | Amos et al. | |
| 6,092,363 | A * | 7/2000 | Ryan | F02C 3/20 60/39.463 |
| 6,832,483 | B2 * | 12/2004 | Moriya | F23D 14/02 60/737 |
| 7,090,205 | B2 * | 8/2006 | Oda | F23R 3/286 261/78.1 |
| 9,121,611 | B2 * | 9/2015 | Koizumi | F23R 3/10 |
| 9,441,545 | B2 * | 9/2016 | Harada | F02C 7/232 |
| 2003/0031972 | A1 * | 2/2003 | Griffin | F23C 7/002 431/354 |
| 2003/0046935 | A1 * | 3/2003 | Halila | F01D 5/08 60/737 |
| 2004/0011054 | A1 * | 1/2004 | Inoue | F23R 3/10 60/776 |
| 2005/0130089 | A1 * | 6/2005 | Oda | F23R 3/14 431/183 |
| 2005/0188703 | A1 * | 9/2005 | Sprouse | F23D 3/40 60/776 |
| 2010/0089066 | A1 * | 4/2010 | Mina | F23D 1/06 60/772 |
| 2010/0175382 | A1 * | 7/2010 | Eroglu | F23C 6/047 60/748 |
| 2010/0269506 | A1 * | 10/2010 | Nonaka | F23D 11/386 60/742 |
| 2011/0265482 | A1 * | 11/2011 | Parsania | F23R 3/286 60/740 |
| 2012/0000203 | A1 * | 1/2012 | Hase | F23R 3/286 60/722 |
| 2012/0164590 | A1 * | 6/2012 | Mach | F23D 14/145 431/328 |
| 2012/0227411 | A1 | 9/2012 | Carroni et al. | |
| 2013/0101948 | A1 * | 4/2013 | Hiraga | F23D 14/08 431/354 |
| 2014/0157779 | A1 * | 6/2014 | Uhm | F23R 3/286 60/725 |
| 2014/0338337 | A1 * | 11/2014 | Prociw | F23R 3/28 60/737 |
| 2018/0135521 | A1 * | 5/2018 | Jung | F02C 7/222 |

FOREIGN PATENT DOCUMENTS

| | | |
|---|---|---|
| JP | 2004-271016 A | 9/2004 |
| JP | 2010-216668 A | 9/2010 |
| JP | 2012-037103 A | 2/2012 |
| JP | 2012-042083 A | 3/2012 |
| JP | 2014-105634 A | 6/2014 |
| WO | 9740316 A1 | 10/1997 |

OTHER PUBLICATIONS

Glassman, Irvin and Yetter, Richard, Combustion, Fourth Edition, Elsevier, 2008, pp. 200-208 (Year: 2008).*
The First Office Action issued by State Intellectual Property Office of the People's Republic of China dated Apr. 27, 2017, which corresponds to Chinese Patent Application No. 201580004502.4 and is related to U.S. Appl. No. 15/508,736; with English language translation of search report.
International Search Report issued in PCT/JP2015/004908; dated Dec. 28, 2015.
Written Opinion issued in PCT/JP2015/004908; dated Dec. 28, 2015.
International Preliminary Report on Patentability of the International Searching Authority; PCT/JP2015/004908; dated Apr. 4, 2017.
An Office Action mailed by the German Patent and Trade Mark Office dated Feb. 10, 2020, which corresponds to German Patent Application No. DE 11 2015 004 436.1 with English Translation.

* cited by examiner

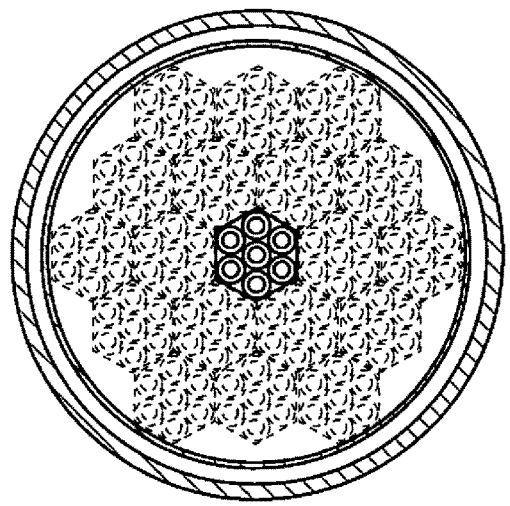
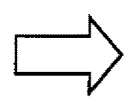
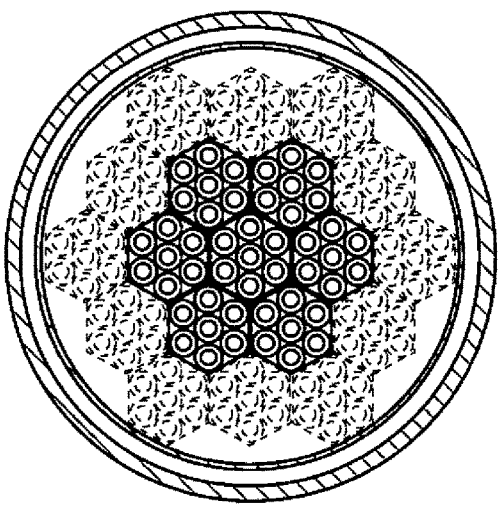
Fig. 8 (a)
Fig. 8 (b)
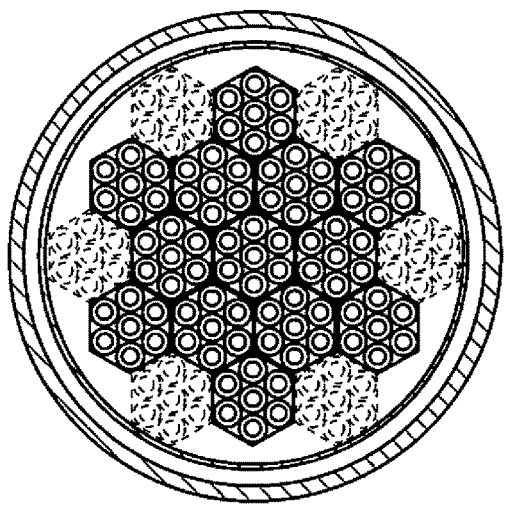
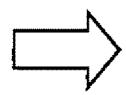
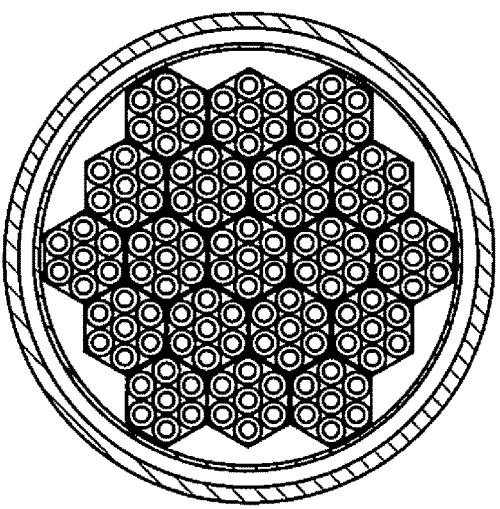
Fig. 8 (c)
Fig. 8 (d)

FUEL INJECTION NOZZLE, FUEL INJECTION MODULE AND GAS TURBINE

TECHNICAL FIELD

The present invention relates to a fuel injection nozzle.

BACKGROUND ART

For environment protection purposes, it is desirable to reduce a nitrogen oxide (NOx) exhausted from a gas turbine. As a method of reducing the exhaust amount of NOx, there is a method in which fuel and air are pre-mixed to generate an air-fuel mixture, and the air-fuel mixture is injected from a fuel injection nozzle and combusted (pre-mixing combustion method). In accordance with this method, by controlling the ratio of the fuel to the air-fuel mixture so that the fuel ratio becomes as low as possible, a temperature distribution in which a combustion temperature is low and uniform in the interior of a combustion chamber is obtained, and an increase in the combustion temperature can be suppressed. As a result, generation of NOx (thermal NOx) due to the increase in the combustion temperature can be suppressed (see Patent Literature 1).

CITATION LIST

Patent Literature

Patent Literature 1: Japanese Laid-Open Patent Application Publication No. 2010-216668

SUMMARY OF INVENTION

Technical Problem

If compressed air is pre-mixed with the fuel in a large amount inside the fuel injection nozzle, a "flashback flame" may occur, in which a flame propagates from the combustion chamber to the fuel injection nozzle, and cause burning damages to the fuel injection nozzle. In particular, in a case where a gas with a high reactivity, such as a hydrogen gas, is used as the fuel, the flashback flame tends to occur.

In view of the above-described circumstances, the present invention has been developed. An object of the present invention is to provide a fuel injection nozzle which pre-mixes a fuel gas and air, injects an air-fuel mixture into a combustion chamber, and has a high resistance to a flashback flame.

Solution to Problem

According to an aspect of the present invention, a fuel injection nozzle comprises: a pre-mixing passage which mixes fuel and air to generate an air-fuel mixture; and an injection port which is located downstream of the pre-mixing passage and injects the air-fuel mixture into a combustion chamber, wherein the fuel injection port has a slit shape and a width that is less than a dimension that is twice as large as a quenching distance. In accordance with this configuration, by use of a pre-mixing/combustion method, the generation amount of NOx can be reduced. In addition, since the width of the injection port is less than the dimension that is twice as large as the quenching distance, the flame does not go beyond the injection port and therefore does not propagate to the interior of the fuel injection nozzle. As a result, the occurrence of a flashback flame can be suppressed effectively.

In the above-described fuel injection nozzle, the pre-mixing passage may have a passage cross-sectional area decreasing toward a downstream side. In accordance with this configuration, since the passage cross-sectional area of the injection port located at the downstream end portion of the pre-mixing passage can be reduced, the injection speed of the fuel injected from the fuel injection nozzle can be increased. As a result, the occurrence of the flashback flame can be suppressed more effectively. Further, since the passage cross-sectional area of the injection port is reduced, pre-mixing in the interior of the pre-mixing passage is facilitated. Thus, non-uniformity of the fuel ratio of the air-fuel mixture can be suppressed, and more uniform combustion can be performed.

In the above-described fuel injection nozzle, the pre-mixing passage may include: a first mixing section which mixes the fuel and the air to generate the air-fuel mixture in such a manner that a ratio of the fuel to the air-fuel mixture becomes a first fuel ratio; and a second mixing section which mixes the air-fuel mixture generated in the first mixing section and the air to generate the air-fuel mixture in such a manner that the ratio of the fuel to the air-fuel mixture becomes a second fuel ratio lower than the first fuel ratio. In accordance with this configuration, by setting the first fuel ratio to a value higher than a specified value, the flame is less likely to propagate to the first mixing section. Therefore, the effects of the flashback flame can be suppressed even if the flashback flame occurs.

In the above-described fuel injection nozzle, the first fuel ratio may be set to be equal to or higher than a value that is 15 vol % lower than an upper limit value of a combustible range. In accordance with this configuration, the effects of the flashback flame can be substantially suppressed.

In the above-described fuel injection nozzle, the pre-mixing passage may include: a flame prevention plate which is located at a boundary region between the first mixing section and the second mixing section and has a through-hole with a diameter that is less than a dimension that is twice as large as the quenching distance. In accordance with this configuration, even if the flame propagates to the interior of the fuel injection nozzle, this flame does not go beyond the flame prevention plate and therefore does not reach the first mixing section. As a result, the effects of the flashback flame can be suppressed.

According to another aspect of the present invention, a fuel injection module comprises: a plurality of fuel injection nozzles each of which is recited above; and a fuel supply section which supplies the fuel to the plurality of fuel injection nozzles, wherein the fuel supply section branches at a downstream portion thereof into branch portions which supply the fuel to the plurality of fuel injection nozzles, respectively. In accordance with this configuration, the fuel is injected at many spots, and hence the flame at each fuel injection position is small. As a result, the risk of occurrence of the flashback flame can be reduced more effectively, and combustion can be stabilized.

According to a further aspect of the present invention, a gas turbine comprises one of the above-described fuel injection nozzles or the above-described fuel injection module.

Advantageous Effects of Invention

As described above, in accordance with the above-described fuel injection nozzle, even when the fuel and the air are pre-mixed in large amounts in the interior of the fuel injection nozzle and the air-fuel mixture is injected into the combustion chamber, the occurrence of the flashback flame can be suppressed.

BRIEF DESCRIPTION OF DRAWINGS

FIGS. 8(a)-8(d) are views showing the injection method of the air-fuel mixture which is performed by a fuel injector.

DESCRIPTION OF EMBODIMENTS

Hereinafter, the embodiment of the present invention will be described with reference to the drawings. Throughout the drawings, the same or corresponding components are designated by the same reference symbols and will not be described repeatedly.

<Configuration of Gas Turbine>

Figure 1:
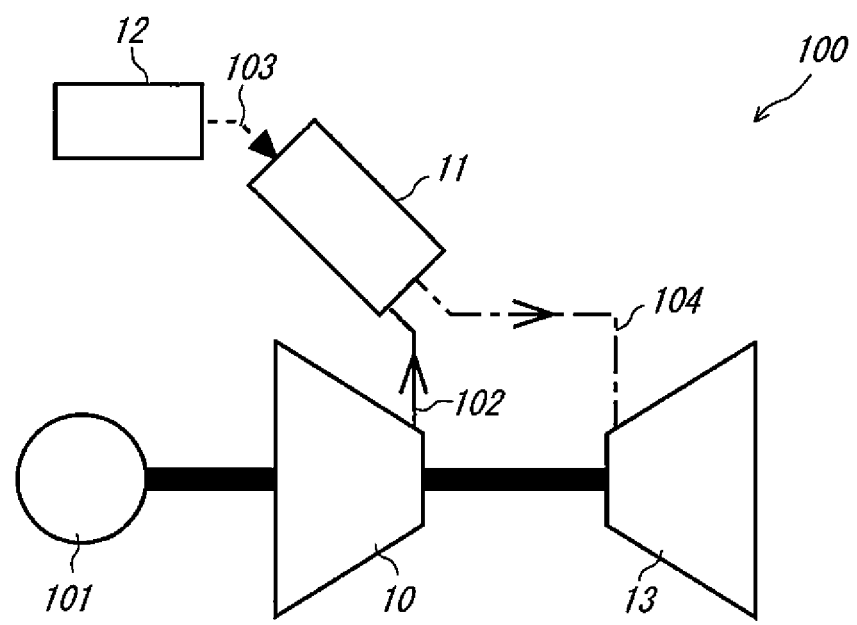
FIG. 1 is a view schematically showing the configuration of a gas turbine.

First of all, the overall configuration of a gas turbine 100 will be described. FIG. 1 is a view schematically showing the configuration of the gas turbine 100. The gas turbine 100 of the present embodiment is a gas turbine used for power generation, which drives a power generator 101. The gas turbine 100 includes a compressor 10, a combustor 11, a fuel supply device 12, and a turbine 13.

Compressed air 102 is supplied from the compressor 10 to the combustor 11. Fuel 103 is supplied from the fuel supply device 12 to the combustor 11. In the present embodiment, the fuel 103 with a high reactivity (combustion speed), containing a hydrogen gas, is used. The fuel 103 containing the hydrogen gas includes a by-product gas containing the hydrogen gas which is generated in petroleum refining factories or petrochemical factories, and a pure hydrogen gas. In the interior of the combustor 11, the fuel 103 and the air 102 are combusted. A combustion gas 104 in a high-temperature and high-pressure state generated by the combustion is supplied to the turbine 13. The turbine 13 rotates by energy of the combustion gas 104, and drives the power generator 101 via the compressor 10.

<Configuration of Combustor>

Figure 2:
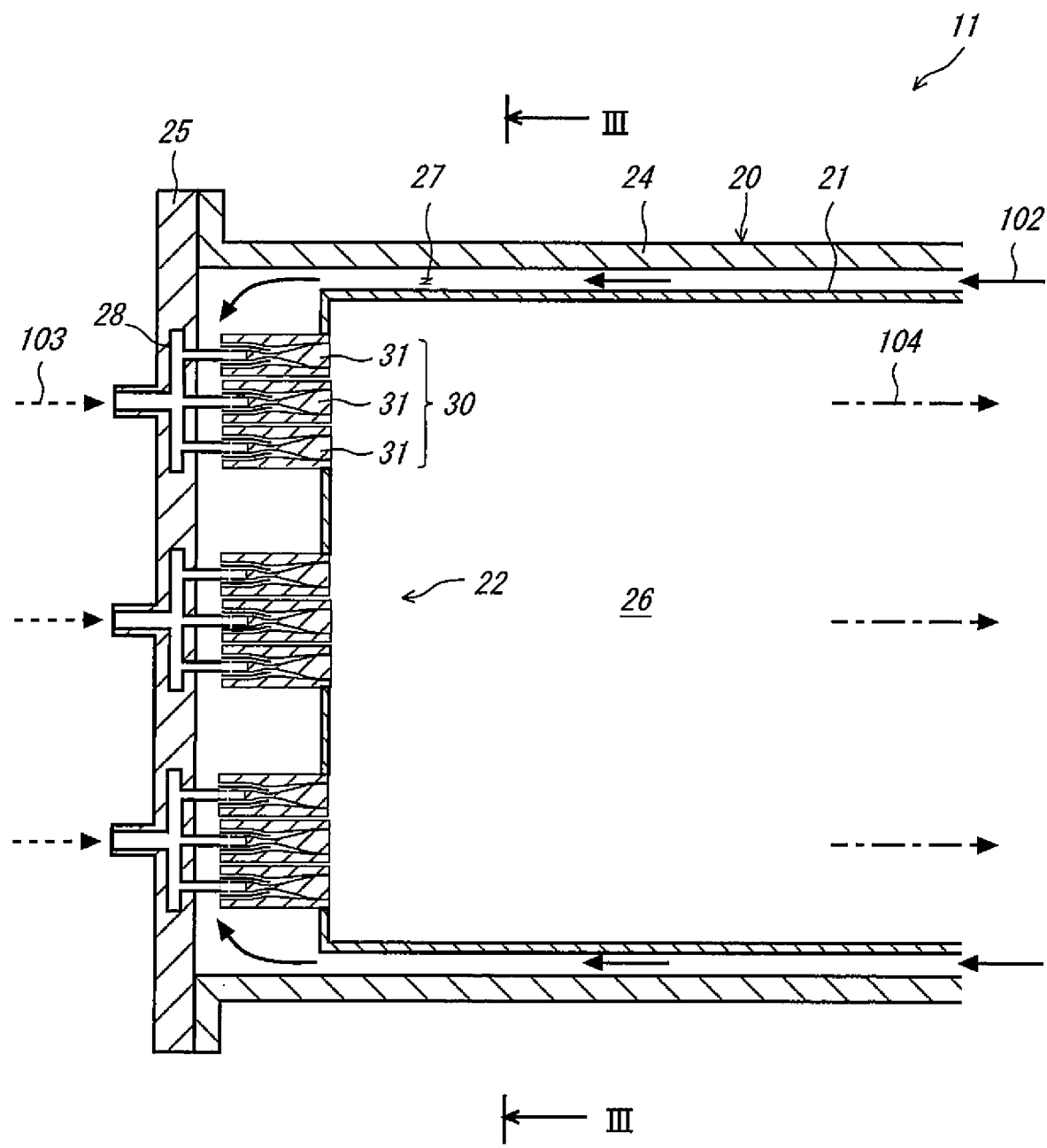
FIG. 2 is a cross-sectional view showing the end portion of a combustor in an enlarged manner.

Next, the combustor 11 will be described more specifically. FIG. 2 is a cross-sectional view showing the end portion of the combustor 11 in an enlarged manner. As shown in FIG. 2, the combustor 11 includes a housing 20, a combustion tube 21, and a fuel injector 22.

The housing 20 is a member defining the contour of the combustor 11. The housing 20 includes a cylindrical outer pipe member 24, and a disc-shaped end cover 25 provided at the end portion of the outer pipe member 24 on a first side (left side in FIG. 2).

The combustion tube 21 is housed inside the housing 20. A combustion chamber 26 is formed inside the combustion tube 21. The fuel injector 22 is located at the end portion of the combustion tube 21. Between the combustion tube 21 and the housing 20, an annular air passage 27 is formed. The air 102 supplied from the compressor 10 flows through the air passage 27 and toward the main fuel injector 22 (toward the left side in FIG. 2). Although the combustor 11 of the present embodiment is of a reverse flow can type in which the air 102 and the combustion gas 104 flow in opposite directions, the combustor 11 may have a structure different from the reverse flow can type.

The fuel injector 22 is configured to take in the air 102 which has flowed through the air passage 27, and the fuel 103 supplied from the fuel supply device 12 via fuel supply sections 28. The fuel injector 22 mixes the air 102 and the fuel 103 to generate an air-fuel mixture, and injects the air-fuel mixture into the combustion chamber 26. In the interior of the combustion chamber 26, the air-fuel mixture is combusted to generate the combustion gas 104. The generated combustion gas 104 flows toward the right side in FIG. 2 and is supplied to the turbine 13 (see FIG. 1). In the present embodiment, the ratio of the fuel 103 to the air-fuel mixture is controlled to become as low as possible. In this way, a temperature distribution in which a combustion temperature is low and uniform in the interior of the combustion chamber 26 can be obtained. As a result, an increase in the combustion temperature can be suppressed, and the generation of NOx can be suppressed.

Figure 3:
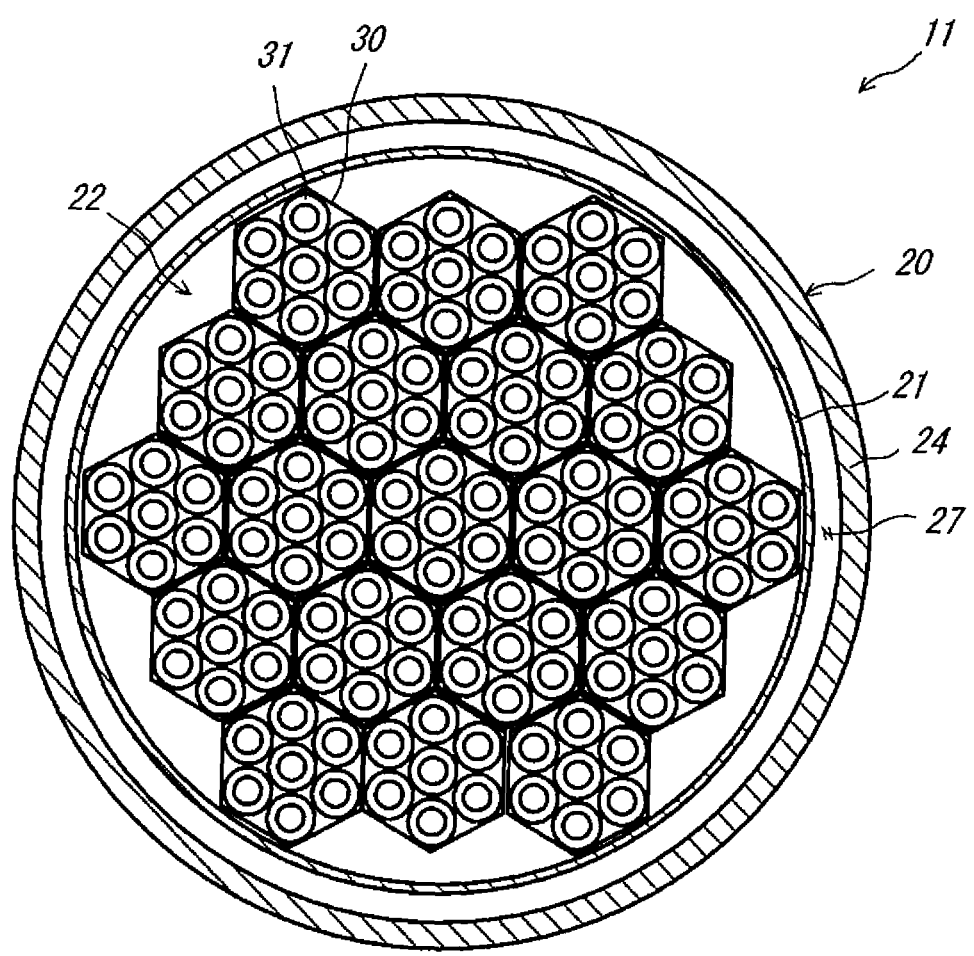
FIG. 3 is a cross-sectional view taken in the direction of arrows along line of FIG. 2.

FIG. 3 is a cross-sectional view taken in the direction of arrows along line of FIG. 2. As shown in FIG. 3, the fuel injector 22 includes a plurality of fuel injection modules 30. Each of the plurality of fuel injection modules 30 has a hexagonal shape when viewed from a front (from the perspective of the combustion chamber 26), and includes seven fuel injection nozzles 31. In the fuel injector 22 of the present embodiment, one fuel injection module 30 is disposed at a center of the fuel injector 22. Six fuel injection modules 30 are disposed around the fuel injection module 30 located at the center. Twelve fuel injection modules 30 are disposed around the six fuel injection modules 30. As shown in FIG. 2, each of the plurality of fuel injection modules 30 includes the fuel supply section 28 and the plurality of fuel injection nozzles 31. The fuel supply section 28 branches at a downstream portion thereof into branch portions coupled to the fuel injection nozzles 31, respectively, in each of the fuel injection modules 30. In this configuration, the fuel 103 supplied from the fuel supply device 12 is distributed to each of the plurality of fuel injection modules 30, and the fuel supply section 28 supplies the fuel to the fuel injection nozzles 31 in each of the plurality of fuel injection modules 30.

<Configuration of Fuel Injection Nozzle>

Figure 4:
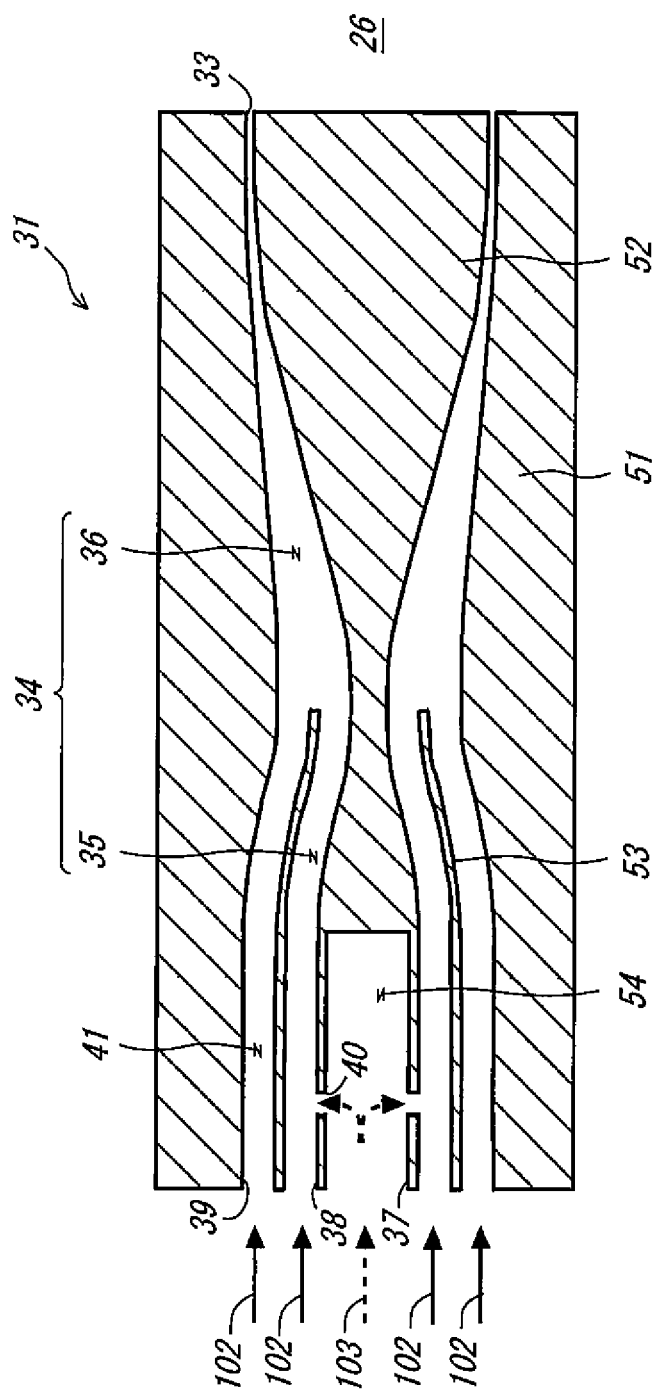
FIG. 4 is a cross-sectional view of a fuel injection nozzle.
Figure 5:
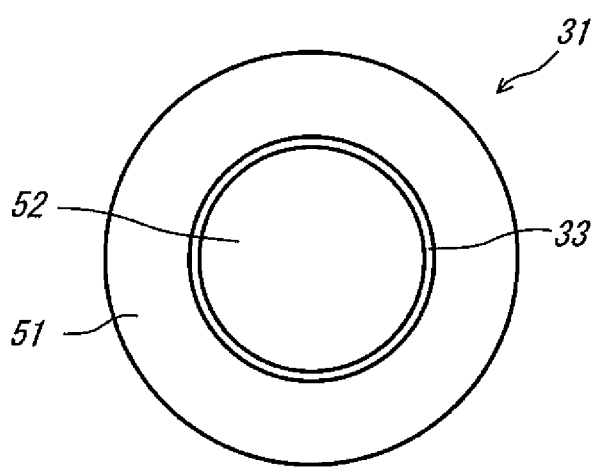
FIG. 5 is a front view of the fuel injection nozzle.

Next, the fuel injection nozzle 31 included in the fuel injection module 30 will be described in detail. FIG. 4 is a cross-sectional view of the fuel injection nozzle 31. FIG. 5 is a front view of the fuel injection nozzle 31 (from the perspective of the combustion chamber 26). As shown in FIGS. 4 and 5, the fuel injection nozzle 31 includes an outer member 51, an inner member 52, and an intermediate member 53.

The outer member 51 is a member corresponding to a radially outward portion of the fuel injection nozzle 31, and has a cylindrical shape. The inner diameter of the outer member 51 is equal at an upstream portion thereof, decreases gradually from the upstream portion toward a region that is in the vicinity of an axial center thereof, and then increases gradually from the region that is in the vicinity of the axial center toward a downstream end portion thereof.

The inner member 52 is placed inside the outer member 51 so as to form a gap between the inner member 52 and the outer member 51. The inner member 52 is equal in axial dimension to the outer member 51. The inner member 52 has a substantially solid tube shape, except for an upstream portion thereof. The outer diameter of the inner member 52 is equal at the upstream portion thereof, decreases gradually from the upstream portion toward a region that is in the vicinity of an axial center thereof, and then increases gradually from the region that is in the vicinity of the axial center toward a downstream end portion thereof. The upstream portion of the inner member 52 has a cylindrical shape, and a fuel take-in section 54 is formed inside the upstream portion of the inner member 52.

The intermediate member 53 has a cylindrical shape. The intermediate member 53 is placed in a region of a gap formed between the outer member 51 and the inner member 52, the region being located downstream of a region that is in the vicinity of the axial centers of the outer member 51 and of the inner member 52. The intermediate member 53 has a constant thickness. The outer diameter of the intermediate member 53 is equal in an upstream portion thereof, and decreases gradually from a region that is in the vicinity of an axial center thereof toward a downstream end portion thereof.

An annular first mixing section 35 is formed between the inner member 52 and the intermediate member 53. An annular second mixing section 36 is formed between the outer member 51 and the inner member 52 in a region that is downstream of the region that is in the vicinity of the axial center. The second mixing section 36 has a passage cross-section which decreases toward a downstream side. The first mixing section 35 and the second mixing section 36 constitute a pre-mixing passage 34. An annular injection port 33 is formed between the downstream end portion of the outer member 51 and the downstream end portion of the inner member 52. An annular air supply passage 41 is formed between the outer member 51 and the intermediate member 53. The above-described passages and the like will be described in detail below.

The injection port 33 is located downstream of the pre-mixing passage 34 and is a section which injects the air-fuel mixture into the combustion chamber 26. As shown in FIG. 5, the injection port 33 has a ring shape and a slit shape. The injection port 33 has a width (dimension in a direction perpendicular to a direction in which the slit extends) that is set to be equal to or larger than a quenching distance and less than a dimension that is twice as large as the quenching distance. As defined herein, the "quenching distance" refers to a minimum distance at which the flame can get close to the metal member. If a distance from the flame to the metal member becomes less than the quenching distance, heat loss of the flame is caused by the metal member, combustion cannot be maintained, and the flame is quenched (extinguished).

The quenching distance includes a flat plate quenching distance and a circular tube quenching distance. The "flat plate quenching distance" is defined as a quenching distance between two flat plates. The "circular tube quenching distance" refers to a quenching distance within a circular tube. The flat plate quenching distance is equal to about 70% of the circular tube quenching distance. The quenching distance is varied depending on use conditions including a fuel component, an ambient pressure, and an ambient temperature, a geometric shape of a fuel blowing port, or the like. It is said that the flat plate quenching distance of hydrogen under a room temperature and an atmospheric pressure is about 0.6 mm. In view of this, in a case where the hydrogen gas is used as the fuel 103, the injection port 33 is designed to have a width that is equal to or larger than 0.6 mm and less than 1.2 mm, in the above-described example.

The fuel injection nozzle 31 of the present embodiment is made of metal. As described above, the width of the injection port 33 is less than the dimension that is twice as large as the quenching distance. In this structure, the distance between the flame which is going to enter the injection port 33 and at least one of the metal portions of the fuel injection nozzle 31 which face each other with the injection port 33 interposed therebetween is less than the quenching distance. Therefore, the flame which is going to enter the injection port 33 is quenched (extinguished). As a result, the flame does not propagate to the interior of the fuel injection nozzle 31, and hence the flashback flame does not occur.

With a decrease in the width of the injection port 33, the passage cross-sectional area of the air-fuel mixture decreases correspondingly, so that the injection speed of the air-fuel mixture increases. This increase in the injection speed can effectively prevent the flashback flame. In a case where the fuel 103 containing the hydrogen gas is used like the present embodiment, the combustion speed of the fuel 103 is higher than that of a natural gas. For this reason, the flame does not go far and the combustion is less likely to become unstable, even in a state in which the injection speed of the air-fuel mixture is high.

Although in the present embodiment, the injection port 33 has the ring shape, the injection port 33 may have other shapes so long as these shapes include the slit shape. For example, the injection port 33 may have a shape in which straight lines cross each other, a shape in which a plurality of straight lines are arranged in parallel with each other, or a shape including a combination of a circle and a straight line. Further, the injection port 33 may be formed by a number of through-holes. In this case, the injection port 33 desirably has a slit shape including serial through-holes to prevent the area of the injection port 33 (namely, the passage cross-sectional area of the air-fuel mixture) from being reduced excessively. Thus, the combustion can be performed stably.

Next, the pre-mixing passage 34 will be described. The pre-mixing passage 34 is a passage which mixes the fuel 103 and the air 102 to generate the air-fuel mixture. As shown in FIG. 4, the pre-mixing passage 34 has a cylindrical shape, and includes the first mixing section 35 and the second mixing section 36. In the present embodiment, the fuel 103 and the air 102 are mixed in such a manner that first mixing is performed in the first mixing section 35 and second mixing is performed in the second mixing section 36. In other words, in the present embodiment, the fuel 103 and the air 102 are mixed in two stages.

The first mixing section 35 corresponds to the upstream portion of the pre-mixing passage 34. The first mixing section 35 mixes the fuel 103 and the air 102 to generate the air-fuel mixture with a relatively high fuel ratio (fuel-rich air-fuel mixture). The fuel injection nozzle 31 is provided with a fuel inlet 37 coupled to the fuel supply section 28 (see FIG. 2) and a first annular air inlet 38 surrounding the fuel inlet 37, on a surface which is on an opposite side of the injection port 33. The fuel 103 is taken in through the fuel inlet 37 and supplied to the first mixing section 35 via the fuel take-in section 54 and a fuel supply passage 40. The air 102 is taken in through the first air inlet 38 and supplied to the first mixing section 35. Then, the fuel 103 and the air 102 supplied to the first mixing section 35 are mixed in the interior of the first mixing section 35 and flows toward the second mixing section 36.

The second mixing section 36 corresponds to the downstream portion of the pre-mixing passage 34. The second mixing section 36 mixes the air-fuel mixture generated in the first mixing section 35 and the air 102 to generate the air-fuel mixture with a relatively low fuel ratio (fuel-lean air-fuel mixture). The fuel injection nozzle 31 is provided with an annular second air inlet 39 surrounding the first air inlet 38, on a surface which is on an opposite side of the injection port 33. The air-fuel mixture is supplied from the first mixing section 35 to the second mixing section 36, while the air 102 is taken in through the second air inlet 39 and supplied to the second mixing section 36 via an air supply passage 41. The air-fuel mixture and the air 102 supplied to the second mixing section 36 are mixed in the interior of the second mixing section 36 and flows toward the injection port 33.

Figure 6:
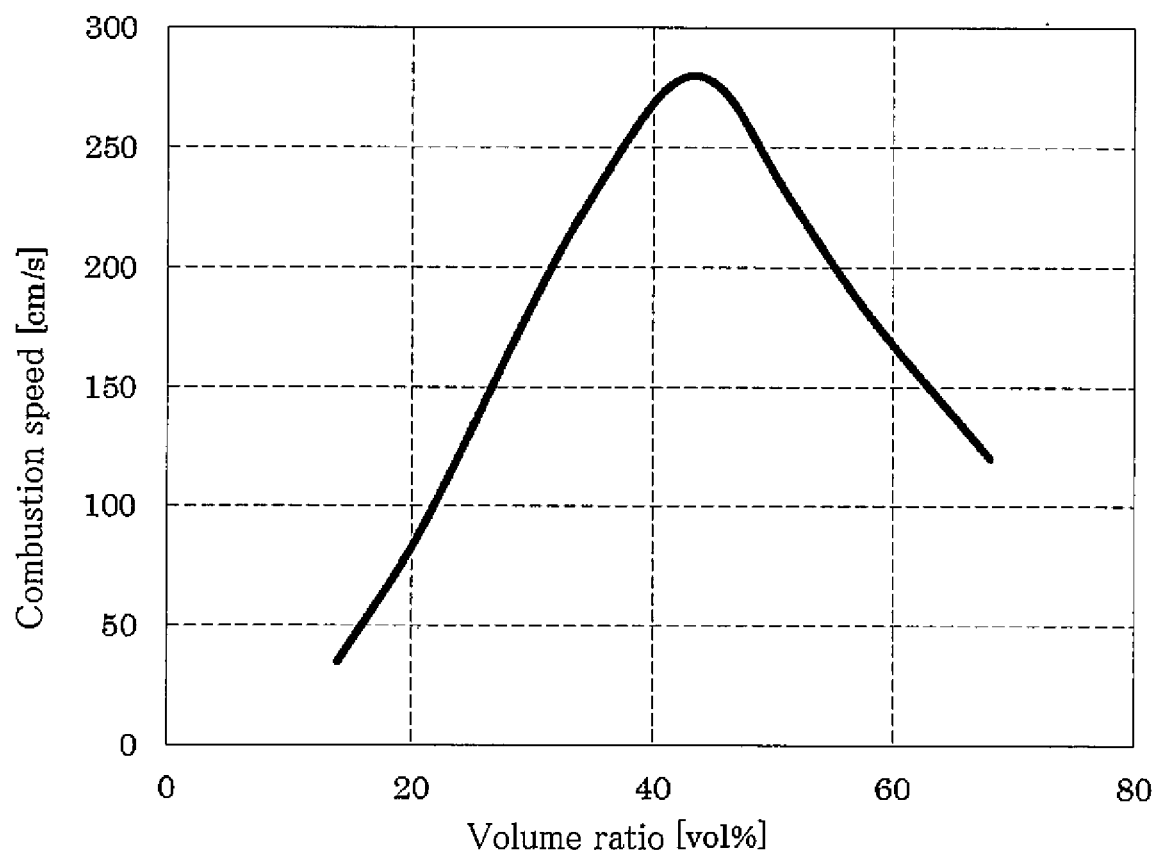
FIG. 6 is a view showing a relation between a ratio of fuel to an air-fuel mixture and a combustion speed.

FIG. 6 is a view showing a relation between the fuel ratio of the air-fuel mixture (volume ratio of the fuel to the whole of the air-fuel mixture; vol %), and the combustion speed (cm/s), in a case where the fuel 103 is the hydrogen gas. In FIG. 6, a horizontal axis indicates the fuel ratio and a vertical axis indicates the combustion speed. Although FIG. 6 shows the fuel ratio and the combustion speed in a case where the fuel 103 is the hydrogen gas, a similar trend is shown in a case where the fuel 103 is a gas different from the hydrogen gas. There is a range of the fuel ratio (in general "combustible range (or combustion range)" in which the air-fuel mixture can be combusted. This combustible range is determined based on the component of the fuel 103. In a case where the fuel 103 is the hydrogen gas, the lower limit value of the combustible range is 4 vol % and the upper limit value of the combustible range is 75 vol %. Also, as shown in FIG. 6, the combustion speed has a peak in the fuel ratio of about 40 vol %, in a case where the fuel 103 is the hydrogen gas.

In the present embodiment, the fuel ratio (hereinafter will be referred to as a "first fuel ratio") of the air-fuel mixture generated in the first mixing section 35 is set to be higher than the upper limit value of the combustible range. In a case where the fuel 103 is the hydrogen gas, the upper limit value of the combustible range is 75 vol % as described above. Therefore, the first fuel ratio is set to be higher than 75 vol %. In accordance with this setting, even when the flame enters the fuel injection nozzle 31, this flame does not propagate to the first mixing section 35. Thus, the flashback flame can be prevented reliably. The first fuel ratio may be set to be equal to or higher than a value that is 15 vol % lower than the upper limit value of the combustible range. In the above-described example, the first fuel ratio may be set to be equal to or higher than 60 vol % that is 15 vol % lower than 75 vol % as the upper limit value of the combustible range. In this setting, the flashback flame can be substantially prevented.

The fuel ratio (hereinafter will be referred to as a "second fuel ratio") of the air-fuel mixture generated in the second mixing section 36 is set to be equal to or higher than the lower limit value of the combustible range, and equal to or lower than the fuel ratio in which the combustion speed has a peak. It should be noted that the upper limit value of the second fuel ratio is desirably low in view of the generation amount of NOx. As described above, in a case where the fuel 103 is the hydrogen gas, the lower limit value of the combustible range is 4 vol %, and the fuel ratio in which the combustion speed has a peak is about 40 vol %. In view of this, in a case where the fuel 103 is the hydrogen gas, the second fuel ratio is set to, for example, 4 to 15 vol %, although this is varied depending on the running state of the engine. In this way, the second fuel ratio, namely, the fuel ratio of the air-fuel mixture injected into the combustion chamber 26 is set to be low and uniform. As a result, the combustion temperature can be lowered, and the generation amount of NOx can be reduced.

Figure 7:
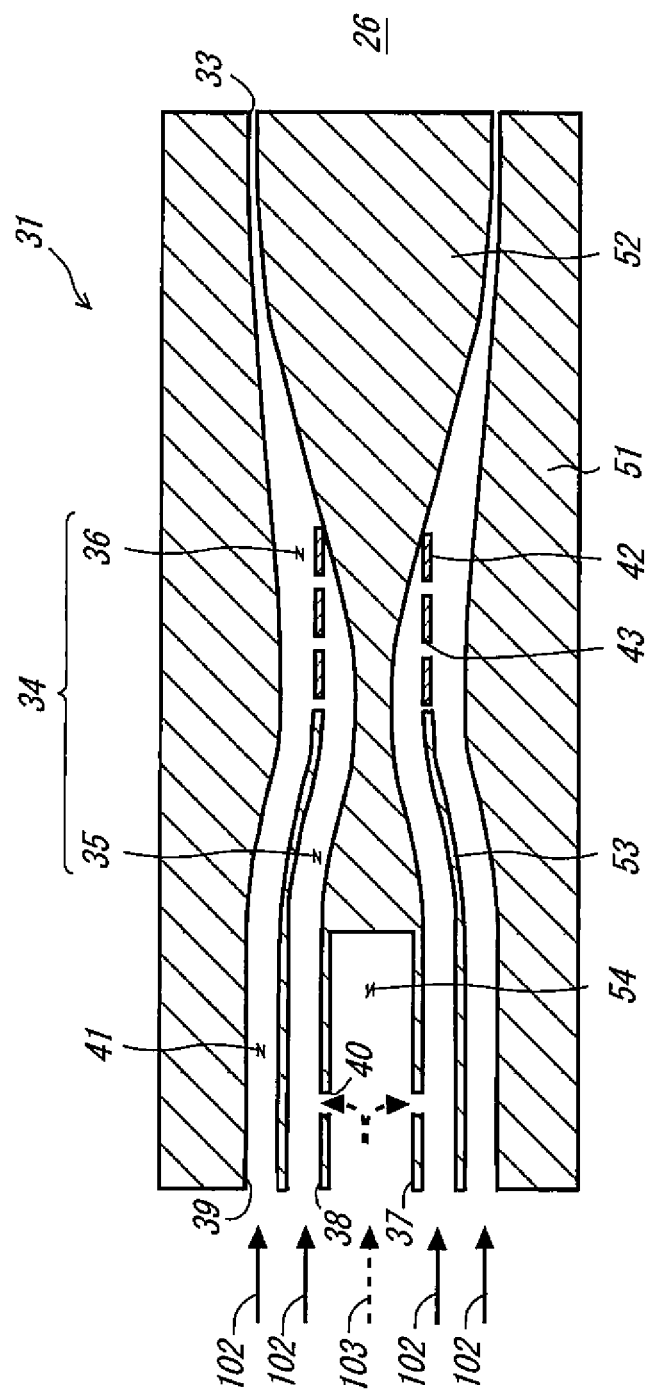
FIG. 7 is a cross-sectional view of a fuel injection nozzle according to a modified example.

To prevent the flashback flame, as shown in FIG. 7, a flame prevention plate 42 may be provided at a boundary region between the first mixing section 35 and the second mixing section 36, as well as the above-described configuration. The flame prevention plate 42 has a number of through-holes 43. Each of the through-holes 43 is designed to have a diameter that is equal to or larger than the circular tube quenching distance and equal to or less than a dimension that is twice as large as the circular tube quenching distance. By providing the flame prevention plate 42 having such a structure, the air-fuel mixture passes through the through-holes 43, whereas the flame does not go beyond the flame prevention plate 42 and therefore does not propagate to the first mixing section 35. As a result, the effects of the flashback flame can be reduced more reliably than in the case of FIG. 4.

<Injection Method of Fuel>

Next, the injection method of the fuel 103 which is performed by the fuel injector 22 will be described. In the present embodiment, the number of the fuel injection modules 30 (fuel injection nozzles 31) which inject the fuel 103 (air-fuel mixture) is changed depending on the running state of the gas turbine 100. As described above, in the present embodiment, the fuel 103 can be supplied to each of the fuel injection modules 30. Therefore, the number of the fuel injection modules 30 (the number of the fuel injection nozzles 31) which inject the fuel 103 can be changed. FIGS. 8(a)-8(d) are views corresponding to FIG. 3. FIGS. 8(a)-8(d) show that the fuel injection modules 30 drawn by broken lines do not inject the fuel 103 and the fuel injection modules 30 drawn by solid lines inject the fuel 103.

At start-up of the gas turbine 100, as shown in FIG. 8(a), one fuel injection module 30 injects the fuel 103. Although in the present embodiment, only the fuel injection module 30 located at the center injects the fuel 103, only the fuel injection module 30 located in a region different from the center may inject the fuel 103. For example, only the fuel injection module 30 located closest to an ignition plug may inject the fuel.

During a period that passes from when the gas turbine 100 has started-up until the rotational speed of the gas turbine 100 reaches a steady rotational speed, as shown in FIG. 8(b), the fuel injection module 30 located at the center, and the fuel injection modules 30 surrounding the fuel injection module 30 located at the center inject the fuel 103. In other words, to increase the fuel injection amount of the fuel injector 22 (the whole of the fuel injection nozzles 31), the number of the fuel injection modules 30 which inject the fuel 103 is increased.

After the rotational speed of the gas turbine 100 has reached the steady rotational speed, the number of the fuel injection modules 30 which inject the fuel 103 is changed depending on the load of the gas turbine 100. Specifically, with an increase in the load of the gas turbine 100, the number of the fuel injection modules 30 which inject the fuel 103 is increased in the order of FIG. 8(c) and FIG. 8(d). The number of the fuel injection modules 30 which inject the fuel 103 may be increased by one or plural numbers at a time.

As described above, in accordance with the present embodiment, even when the fuel injection amount of the whole of the fuel injection nozzles 31 is significantly changed, the number of the fuel injection nozzles 31 which inject the fuel 103 is changed according to the change in the fuel injection amount of the whole of the fuel injection nozzles 31. Therefore, the fuel injection amount of each of the fuel injection nozzles 31 is not significantly changed. This makes it possible to maintain the fuel ratio of the air-fuel mixture generated in the first mixing section 35 at the above-described first fuel ratio and maintain the fuel ratio of the air-fuel mixture generated in the second mixing section 36 at the above-described second fuel ratio.

So far, the present embodiment has been described. Although in the above-described embodiment, the fuel injector 22 (fuel injection nozzles 31) is provided at the end portion of the combustion tube 21, the fuel injector 22 may be provided at another location of the combustion tube 21. For example, one of the fuel injection modules 30 may be provided in a region which is in the vicinity of the axial center of the combustion tube 21, and this fuel injection module 30 may be used as an auxiliary burner.

Although in the above-described embodiment, the fuel injection nozzles 31 (fuel injection modules 30) are used in the gas turbine 100, the fuel injection nozzles 31 (fuel injection modules 30) may be used in a boiler, an absorption chiller, or the like as well as the gas turbine. In addition, although in the above-described embodiment, the fuel 103 contains the hydrogen gas, the fuel injection nozzles 31 may be used with fuel which does not contain the hydrogen gas.

INDUSTRIAL APPLICABILITY

In accordance with the fuel injection nozzle of the present invention, the generation amount of NOx can be reduced, and occurrence of a flashback flame can be suppressed. Therefore, the fuel injection nozzle of the present invention is useful in the technical field of the fuel injection nozzle.

REFERENCE SIGNS LIST

26 combustion chamber
30 fuel injection module
31 fuel injection nozzle
33 injection port
34 pre-mixing passage
35 first mixing section
36 second mixing section
42 flame prevention plate
43 through-hole
100 gas turbine
102 air
103 fuel

The invention claimed is:

1. A fuel injection nozzle comprising:
a pre-mixing passage which mixes fuel and air to generate an air-fuel mixture; and
an injection port which is located downstream of the pre-mixing passage and injects the air-fuel mixture into a combustion chamber,
wherein the injection port has a slit shape and a width that is less than a dimension that is twice as large as a quenching distance,
wherein the pre-mixing passage includes:
a first mixing section which mixes the fuel and the air to generate the air-fuel mixture in such a manner that a ratio of the fuel to the air-fuel mixture becomes a first fuel ratio; and
a second mixing section which mixes the air-fuel mixture generated in the first mixing section and the air to generate the air-fuel mixture in such a manner that the ratio of the fuel to the air-fuel mixture becomes a second fuel ratio lower than the first fuel ratio, and
wherein the second mixing section has a passage cross-sectional area decreasing toward a downstream side.

2. The fuel injection nozzle according to claim 1,
wherein the first fuel ratio is set to be equal to or higher than a value that is 15 vol % lower than an upper limit value of a combustible range.

3. The fuel injection nozzle according to claim 2,
wherein the pre-mixing passage includes:
a flame prevention plate which is located at a boundary region between the first mixing section and the second mixing section and has a through-hole with a diameter that is less than a dimension that is twice as large as the quenching distance.

4. A fuel injection module comprising:
a plurality of fuel injection nozzles each of which is recited in claim 3; and
a fuel supply section which supplies the fuel to the plurality of fuel injection nozzles,
wherein the fuel supply section branches at a downstream portion thereof into branch portions which supply the fuel to the plurality of fuel injection nozzles, respectively.

5. A gas turbine comprising:
the fuel injection nozzle recited in claim 3.

* * * * *